US011334693B1

(12) United States Patent
Flammia

(10) Patent No.: US 11,334,693 B1
(45) Date of Patent: May 17, 2022

(54) SYSTEMS AND METHODS FOR OPTIMIZING QUANTUM COMPUTERS

(71) Applicant: Keysight Technologies Canada Inc., Loveland, CO (US)

(72) Inventor: Steven T. Flammia, New Haven, CT (US)

(73) Assignee: Keysight Technologies Canada Inc., Mississauga (CA)

( * ) Notice: Subject to any disclaimer, the term of this patent is extended or adjusted under 35 U.S.C. 154(b) by 558 days.

(21) Appl. No.: 16/292,138

(22) Filed: Mar. 4, 2019

Related U.S. Application Data

(60) Provisional application No. 62/639,987, filed on Mar. 7, 2018.

(51) Int. Cl.
*G06F 30/20* (2020.01)
*G06N 20/00* (2019.01)
(Continued)

(52) U.S. Cl.
CPC .......... *G06F 30/20* (2020.01); *G06N 10/00* (2019.01); *G06N 20/00* (2019.01); *G06F 2111/10* (2020.01)

(58) Field of Classification Search
CPC ..... G06F 30/20; G06F 2111/10; G06N 10/00; G06N 20/00; G06N 99/002; G06N 3/126; G06K 9/00986; B82Y 10/00
See application file for complete search history.

(56) References Cited

U.S. PATENT DOCUMENTS 5,768,297 A 6/1998 Shor
6,128,764 A * 10/2000 Gottesman ............. B82Y 10/00
714/785
(Continued)

FOREIGN PATENT DOCUMENTS

AU 2013277927 1/2015
CN 1672171 A * 9/2005 ........... G06N 99/002
(Continued)

OTHER PUBLICATIONS

U.S. Appl. No. 16/042,978, filed Jul. 23, 2018.
(Continued)

*Primary Examiner* — Kandasamy Thangavelu

(57) ABSTRACT

Computer systems and methods for constructing a model of the noise afflicting a quantum computer comprising a plurality of qubits are provided. A graph G that describes a conditional independence structure of the noise is obtained. The graph G includes a node for each qubit in the plurality of qubits. The noise afflicting the quantum computer is logically reduced to Pauli noise. The graph G is broken into a plurality of sets. Each respective set $C_j$ in the plurality of sets (i) corresponds a respective qubit j in the plurality of qubits and (ii) comprises a representation of the respective qubit j and the parent qubits $\partial^+ j$ in the graph G. For each respective set $C_j$ in the plurality of sets, a corresponding local conditional probability distribution $\Pr(e_j | e_{\partial+j})$ is characterized in which $e_j \in \mathcal{P}_j$ is a Pauli error on the $j^{th}$ qubit. The characterization is performed by a procedure that comprises estimating a local Pauli fidelity for the respective set $C_j$, thereby learning the model of the noise afflicting the quantum computer.

20 Claims, 3 Drawing Sheets

(51) Int. Cl.
*G06N 10/00* (2022.01)
*G06F 111/10* (2020.01)

(56) References Cited

U.S. PATENT DOCUMENTS

| | | | |
|---|---|---|---|
| 8,219,871 B2 | 7/2012 | Roetteler | |
| 9,361,169 B2 | 6/2016 | Berkeley | |
| 9,663,358 B1* | 5/2017 | Cory | G06N 10/00 |
| 9,934,468 B2 | 4/2018 | Mohseni | |
| 10,031,791 B1 | 7/2018 | Wallman | |
| 2008/0140749 A1* | 6/2008 | Amato | B82Y 10/00 |
| | | | 708/490 |
| 2009/0259905 A1* | 10/2009 | Silva | B82Y 10/00 |
| | | | 714/746 |
| 2015/0324705 A1 | 11/2015 | Biercuk et al. | |
| 2016/0328253 A1* | 11/2016 | Majumdar | G06F 9/45504 |
| 2017/0308803 A1* | 10/2017 | Wallman | G06N 10/00 |
| 2018/0046933 A1* | 2/2018 | La Cour | G06N 10/00 |
| 2018/0101784 A1* | 4/2018 | Rolfe | G06K 9/00986 |
| 2018/0349605 A1* | 12/2018 | Wiebe | G06N 10/00 |
| 2019/0095561 A1* | 3/2019 | Pednault | G06N 10/00 |

FOREIGN PATENT DOCUMENTS

| | | | | |
|---|---|---|---|---|
| CN | 101088102 A | * | 12/2007 | |
| CN | 107077642 A | * | 8/2017 | G06N 10/00 |
| JP | 2005267104 A | * | 9/2005 | B82Y 10/00 |
| KR | 20180004226 A | * | 1/2018 | G06N 3/126 |
| WO | WO 2009/117003 A1 | | 9/2009 | |
| WO | WO 2013/188910 A1 | | 12/2013 | |
| WO | WO 2017200536 A1 | * | 11/2017 | G06N 10/00 |

OTHER PUBLICATIONS

U.S. Appl. No. 15/357,775, filed Nov. 21, 2016.
U.S. Appl. No. 15/882,300, filed Jan. 29, 2018.
U.S. Appl. No. 16/027,119, filed Jul. 3, 2018.
U.S. Appl. No. 16/293,365, filed Mar. 5, 2019.
Aharonov, Dorit, et al. "Fault-Tolerant Quantum Computation With Constant Error Rate", Proceedings of the 29th Annual ACM Symposium on Theory of Computing (STOC), 1997, pp. 1-63.
Beigi, Salman, et al. "Simplified instantaneous non-local quantum computation with applications to position-based cryptography", Institute for Quantum Information, Caltech, Sep. 20, 2011, pp. 1-18.
Carignan-Dugas, Arnaud, et al. "Characterizing Universal Gate Sets via Dihedral Benchmarking", Institute for Quantum Computing and the Department of Applied Mathematics, University of Waterloo, Jul. 26, 2018, pp. 1-5.
Cross, Andrew W., et al. "Scalable randomized benchmarking of non-Clifford gates", IBM T.J. Watson Research Center, Oct. 8, 2015, pp. 1-9.
Dankert et al., "Exact and approximate unitary 2-designs and their application to fidelity estimation", arXiv:quant- ph10606161, Aug. 31, 2012, 6 pgs.
Emerson, J., Alicki, R., and Zyczkovvski, K., "Scalable noise estimation with random unitary operators", arXiv: quant-ph/0503243, Dec. 16, 2005. 8 pgs.
Emerson et al., "Symmetrized Characterization of Noisy Quantum Processes," American Association for the Advancement of Science, Science 317, 1893 (2007); downloaded from <http://www.sciencemaq.org> on Apr. 23, 2012, 5 pgs.
Flammia, Steven T., et al. "Direct Fidelity Estimation from Few Pauli Measurements", Institute for Quantum Information, Apr. 29, 2011, pp. 1-9.
Hoeffding, Wassily, "Probability Inequalities for Sums of Bounded Random Variables", Journal of the American Statistical Association, Apr. 10, 2012, pp. 1-19.
Holevo, A.S., "Additivity Conjecture and Covariant Channels", International Journal of Quantum Information, vol. 3, No. 1, 2005, pp. 41-47.
Kern, 0., Alber, G., & Shepelyansky, D.L., "Quantum error correction of coherent errors by randomization," arXiv:quant-ph/0407262, Jul. 30, 2004, 4 pgs.
Kern, 0., & Alber, G., "Selective recoupling and stochastic dynamical decoupling," arXiv:quant-ph/0602167, Feb. 20, 2006, 9 pgs.
Kern, 0., & Alber, G., "Controlling Quantum Systems by Embedded Dynamical Decoupling Schemes," arXiv:quant- ph/0506038, Jun. 5, 2005, 4 pgs.
Kitaev, A. Yu, "Quantum computations: algorithms and error correction", Russian Mathematical Surveys, vol. 52, No. 6, 1997, pp. 1-61.
Knill, E., "Quantum computing with realistically noisy devices," arXiv:quant-ph/0410199, Nov. 2, 2004, 47 pgs.
Knill et al., "Randomized benchmarking of quantum gates," arXiv:0707.0963 [quant-ph], Jul. 6, 2007, 13 pgs.
Lévi, Benjamin, et al. "Efficient error characterization in Quantum Information Processing", Department of Nuclear Science and Engineering, Jul. 20, 2018, pp. 1-11.
Lorenza, V., & Knill, E., "Random Decoupling Schemes for Quantum Control and Error Suppression," Physical Review Letters, PRL 94, 060502 (2005), Feb. 17, 2005, 4 pgs.
Magesan, E., Gambetta, J. M., & Emerson, J., "Characterizing quantum gates via randomized benchmarking," arXiv:1109.6887 [quant-ph], Apr. 27, 2012., 19 pgs.
Magesan, E., Gambetta, J. M., & Emerson, J., "Robust Randomized Benchmarking of Quantum Processes," arXiv:1009.3639v1 [quant-phj. Sep. 19, 2010., 5 pgs.
Magesan, Easwar, et al. "Scalable and Robust Randomized Benchmarking of Quantum Processes", Physical Review Letters, Institute for Quantum Computing and Department of Applied Mathematics, University of Waterloo, May 6, 2011, pp. 1-4.
Magesan et al., "Efficient Measurement of Quantum Gate Error by Interleaved Randomized Benchmarking," arXiv:1203.4550v2 [quant-ph], Mar. 19, 2014, 5 pgs.
Nielsen, Michael A., "A simple formula for the average gate fidelity of a quantum dynamical operation", Centre for Quantum Computer Technology and Department of Physics, University of Queensland, Feb. 1, 2008, pp. 1-3.
Sanders, Yuval R., et al. "Bounding quantum gate error rate based on reported average fidelity", Institute for Quantum Computing, University of Waterloo, Dec. 27, 2015, pp. 1-22.
Santos, L. F., & Lorenza, V., "Enhanced Convergence and Robust Performance of Randomized Dynamical Decoupling," Physical Review Letters, PRL 97, 150501 (2006), Oct. 13, 2006., 4 pgs.
Wallman, Joel, J., et al. "Randomized Benchmarking with Confidence", Institute for Quantum Computing, University of Waterloo, Dec. 18, 2015, pp. 1-31.
Wallman, Joel, J., et al. "Estimating the Coherence of Noise", Institute for Quantum Computing and Department of Applied Mathematics, University of Waterloo, Aug. 25, 2015, pp. 1-10.
Wallman, Joel, J., et al. "Robust Characterization of Loss Rates", Institute for Quantum Computing, University of Waterloo, Waterloo, May 10, 2018, pp. 1-5.
Wallman, Joel J., et al. "Robust characterization of leakage errors", IOP Publishing, New Journal of Physics, 18, 2016, pp. 1-8.
Wallman, Joel, J., & Emerson: J., "Noise tailoring for scalable quantum computation via randomized compiling," arXiv:1512.01098v3 [quant-ph] Jun. 9, 2016.

* cited by examiner

| 202 — A computer system 100 for constructing a model of the noise afflicting a quantum computer 64 comprising a plurality of qubits 102. The computer system 100 comprises one or more digital processors 74, a memory 90/92, and one or more programs. The one or more programs are stored in the memory 90/92 and are configured to be executed by the one or more processors. The one or more programs include instructions for (A) obtaining a graph $G$ 12 that describes a conditional independence structure of the noise, where the graph $G$ includes a node 14 for each qubit 102 in the plurality of qubits and where the noise afflicting the quantum computer 64 is logically reduced to Pauli noise.

204 — The one or more programs further include instructions for logically reducing a source of noise afflicting the quantum computer to Pauli noise by an application of Pauli twirling.

206 — The graph $G$ corresponds to a Bayesian network or a Markov network, and each respective node in the plurality of nodes independently has a number of parent qubits that is $O(\log(n))$ or less.

208 — The plurality of qubits comprises three or more qubits, ten or more qubits, or twenty or more qubits.

↓

210 — Break the graph $G$ into a plurality of sets. Each respective set $C_j$ in the plurality of sets (i) corresponds a respective qubit $j$ in the plurality of qubits and (ii) comprises a representation of the respective qubit $j$ and the parent qubits $\partial^+ j$ in the graph $G$.

↓

212 — For each respective set $C_j$ in the plurality of sets, characterize a corresponding local conditional probability distribution $\Pr(e_j | e_{\partial+j})$, where $e_j \in \mathcal{P}_j$ is a Pauli error on the $j^{th}$ qubit, by a first procedure that comprises estimating a local Pauli fidelity for the respective set $C_j$ thereby learning the model of the noise afflicting the quantum computer.

↓

214 — Optionally, estimate a performance of a fixed quantum error-correcting code on the quantum computer using the model of the noise afflicting the quantum computer.

SYSTEMS AND METHODS FOR OPTIMIZING QUANTUM COMPUTERS

CROSS REFERENCE TO RELATED APPLICATION

This application claims priority to U.S. Patent Application No. 62/639,987, entitled "SYSTEMS AND METHODS FOR OPTIMIZING QUANTUM COMPUTERS," filed Mar. 7, 2018, which is hereby incorporated by reference.

TECHNICAL FIELD

The present disclosure relates generally to systems and methods for optimizing quantum computers.

BACKGROUND

For quantum computers to increase beyond 10 or 15 qubits—the current scale of the most advanced experiments—scalable methods for estimating noise are needed [1]. This task is greatly complicated by the fact that complete characterization of arbitrary quantum systems is impossible beyond this scale. The present methodologies for dealing with this problem are to focus on summary statistics instead of complete characterization [2, 3], to use Monte Carlo methods [4, 5], to use compressed representations of the system that are nonetheless faithful [6-8], or to employ non-scalable methods to get high-precision, complete characterization of small systems [9, 10], which in some cases can then be stitched together to get efficient representations of the global noise [11].

SUMMARY

The present disclosure addresses the above-identified shortcomings by introducing a framework called, in some embodiments, PiCO—Pauli Channel Optimization—for optimizing the performance of quantum devices. The disclosed systems and methods address parts of the engineering cycle by characterizing the errors in the quantum device, finding the optimal performance of a given error correction or fault tolerance scheme, and then constructing a family of decoders that can efficiently approach this optimal performance. Because the above steps are efficient, an additional layer of optimization can be obtained by iteratively choosing candidate codes and fault tolerance schemes to achieve optimal performance subject to realistic hardware constraints. The disclosed systems and methods are scalable to quantum computers using low-rate codes with thousands of physical qubits and a minimal set of assumptions.

In one aspect of the present disclosure, a general procedure for inferring effective noise rates in large-scale quantum devices, including correlations, is provided. The protocol makes use of *probabilistic graphical* models to obtain efficient representations of the noise and to learn the noise parameters and noise structure efficiently, and without conflating distinct error sources. The procedure can use any method for estimating Pauli fidelities on small numbers of qubits, and is not restricted to the examples provided in the present disclosure.

Another aspect of the present disclosure provides a general systems and methods for finding optimal performance thresholds for quantum codes given any noise in the form of a graphical model. This involves mapping the problem to a problem in statistical mechanics and finding a phase boundary.

Another aspect of the present disclosure provides a general method for approximating the optimal performance by making use of tensor networks to decode error syndromes. While the idea of adding an additional layer of code optimization at the end has appeared before in the literature [48, 49], such methods assume that the noise has already been precisely characterized. This latter aspect is included in the present disclosure as example use case of the general framework provided in the present disclosure.

In particular, one aspect of the present disclosure provides a computer system for constructing a model of the noise afflicting a quantum computer comprising a plurality of qubits. The computer system comprises one or more processors, a memory, and one or more programs. The one or more programs are stored in the memory and are configured to be executed by the one or more processors. The one or more programs include instructions for obtaining a graph G that describes a conditional independence structure of the noise. The graph G includes a node for each qubit in the plurality of qubits. The noise afflicting the quantum computer is logically reduced to Pauli noise. In other words, the noise afflicting the quantum computer is modelled as noise sources that affect single qubit in the plurality of qubits. The graph G is broken into a plurality of sets. Each respective set $C_j$ in the plurality of sets (i) corresponds a respective qubit j in the plurality of qubits and (ii) comprises a representation of the respective qubit j and the parent qubits $\partial+j$ in the graph G. For each respective set $C_j$ in the plurality of sets, a corresponding local conditional probability distribution $\Pr(e_j | e_{\partial+j})$ is characterized such that $e_j \in P_j$ is a Pauli error on the $j^{th}$ qubit. This is done by a first procedure that comprises estimating a local Pauli fidelity for the respective set $C_j$ thereby learning the model of the noise afflicting the quantum computer.

In some embodiments, the one or more programs further include instructions for logically reducing a source of noise afflicting the quantum computer to Pauli noise by an application of Pauli twirling.

In some embodiments, the corresponding local distribution comprises all possible Pauli errors on $C_j$, or an appropriate subset thereof, the graph G corresponds to a Bayesian network, a Markov network, or any other factor graph, and each respective node in the plurality of nodes has a constant number of parent qubits.

In some embodiments, the corresponding local distribution comprises all possible Pauli errors on $C_j$ or a subset thereof, the graph G corresponds to a Bayesian network, a Markov network, or any other factor graph, and each respective node in the plurality of nodes has a constant number of parent qubits.

In some embodiments, the graph G corresponds to a Bayesian network, a Markov network, or any other factor graph, and each respective node in the plurality of nodes independently has a number of parent qubits that is O(log (n)) or less.

In some embodiments, the estimating the local Pauli fidelity for the respective set $C_j$ comprises: (i) selecting a respective stabilizer group S in a plurality of stabilizer groups and preparing an approximation of an eigenstate $|\psi\rangle = S_k |\psi\rangle$ for all $S_k \in S$, (ii) applying a Pauli-twirled noise map $\varepsilon$ that is to be characterized m times, where m is a positive integer, (iii) measuring a projection into the corresponding stabilizer basis, where each individual probability is a mixture of multiple exponentials, one for each of the possible eigenvalues in a plurality of eigenvalues, (iv) applying a Walsh-Hadamard transformation on the measurement of step (iii) thereby transforming the measurement into a fidelity decay curve $A_k p_k^m$ using a randomized benchmarking fidelity decay argument, (v) reconstructing a fidelity decay curve $A_k p_k^m$ from the applying (iv) using regression, and (vi) repeating the selecting (i), applying (ii), measuring (iii), applying (iv), and reconstructing (v) for each respective stabilizer group in the plurality of stabilizer groups thereby obtaining each possible Pauli error for Cj, and thereby obtaining an estimate of Pr(eCj), where Pr(eCj) is a marginal distribution of Pauli errors on Cj. In some such embodiments, the one or more programs further include instructions for obtaining $Pr(e_j|e_{\partial+1})$ using a conditional probability relation $Pr(e_j|e_{\partial+1})=Pr(e_{c_j})/Pr(e_{\partial+1})$ thereby learning the model of the noise afflicting the quantum computer.

In some embodiments, the one or more programs further include instructions for estimating a performance of a fixed quantum error-correcting code on the quantum computer using the model of the noise afflicting the quantum computer. In some embodiments, the instructions for estimating the performance of the fixed quantum error-correcting code comprises mapping the fixed quantum error-correcting code to an associated Ising model.

In some embodiments, the plurality of qubits comprises three or more qubits, ten or more qubits, or twenty or more qubits.

Another aspect of the present disclosure provides, at a computer system comprising one or more data processors and a memory, the memory comprising non-transitory instructions configured to perform a method comprising obtaining a graph G that describes a conditional independence structure of a noise afflicting a quantum computer comprising a plurality of qubits, wherein the graph G includes a node for each qubit in the plurality of qubits and wherein the noise afflicting the quantum computer is logically reduced to Pauli noise. In the method, the graph G is broken into a plurality of sets. Each respective set Cj in the plurality of sets (i) corresponds a respective qubit j in the plurality of qubits and (ii) comprises a representation of the respective qubit j and the parent qubits $\partial^+ j$ in the graph G. In the method, for each respective set Cj in the plurality of sets, a corresponding local conditional probability distribution $Pr(e_j|e_{\partial+j})$ is characterized, where $e_j \in \mathcal{P}_j$ is a Pauli error on the $j^{th}$ qubit, by a first procedure that comprises estimating a local Pauli fidelity for the respective set Cj, thereby learning the model of the noise afflicting the quantum computer.

Another aspect of the present disclosure provides a non-transitory computer readable storage medium storing one or more programs. The one or more programs comprise instructions, which when executed by a computer system with one or more processors, cause the computer system to obtain a graph G that describes a conditional independence structure of a noise afflicting a quantum computer comprising a plurality of qubits. The graph G includes a node for each qubit in the plurality of qubits. The noise afflicting the quantum computer is logically reduced to Pauli noise. The one or more programs break the graph G into a plurality of sets. Each respective set Cj in the plurality of sets (i) corresponds a respective qubit j in the plurality of qubits and (ii) comprises a representation of the respective qubit j and the parent qubits $\partial+j$ in the graph G. The one or more programs, for each respective set Cj in the plurality of sets, characterize a corresponding local conditional probability distribution $Pr(e_j|e_{\partial+j})$, where $e_j \in \mathcal{P}_j$ is a Pauli error on the $j^{th}$ qubit, by a first procedure that comprises estimating a local Pauli fidelity for the respective set Cj, thereby learning the model of the noise afflicting the quantum computer.

BRIEF DESCRIPTION OF DRAWINGS

FIG. 3 is a flow chart showing an example quantum computation process in accordance with an embodiment of the present disclosure, in which optional steps are disclosed in dashed boxes.

Like reference numerals refer to corresponding parts throughout the several views of the drawings.

DETAILED DESCRIPTION

Figure 1:
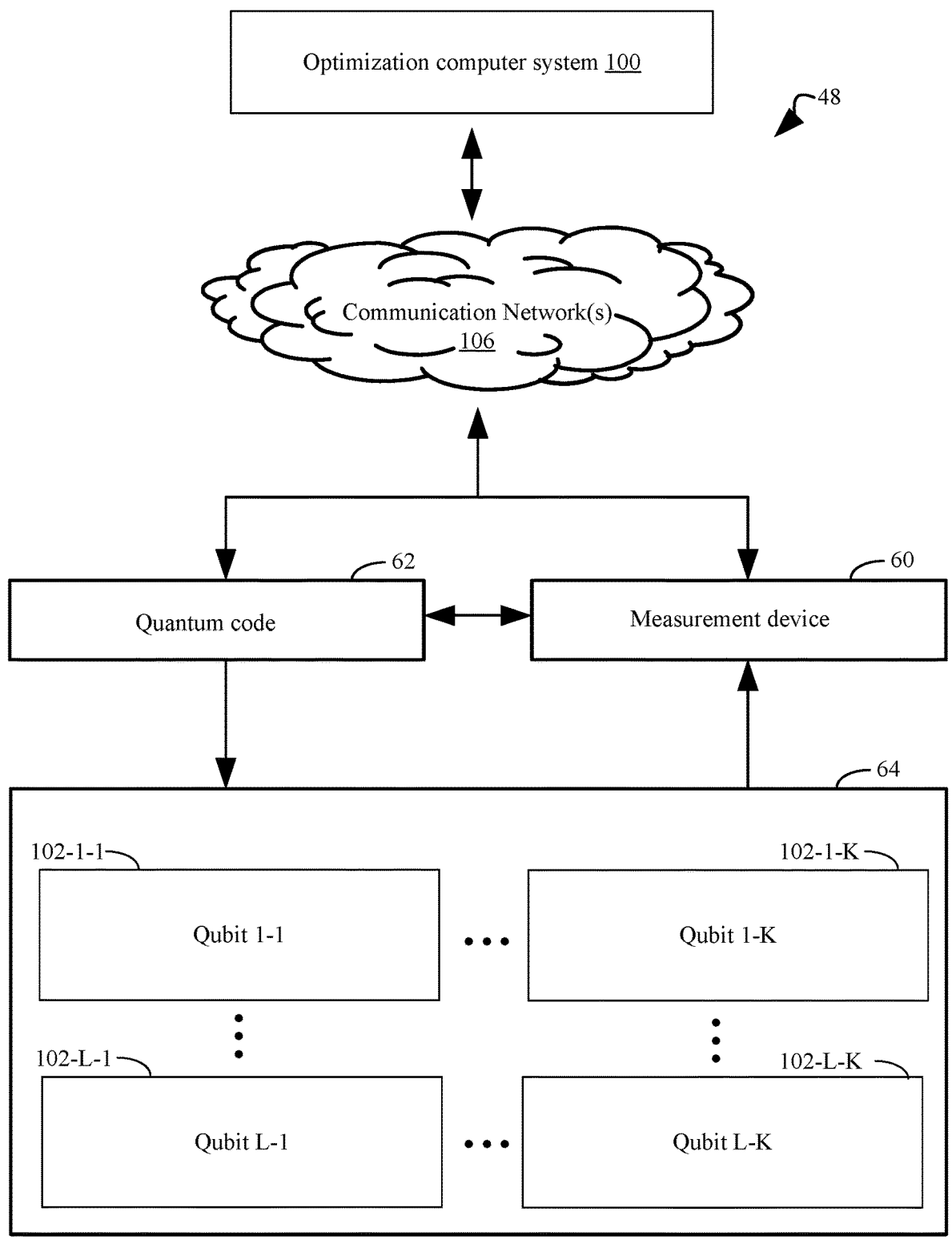
FIG. 1 is a schematic diagram showing aspects of an example system that includes both a classical computer system, for constructing a model of the noise afflicting a quantum computer, and the quantum computer itself, in accordance with an embodiment of the present disclosure.

Disclosed are scalable systems and methods for characterizing errors that account for arbitrary correlations in the noise occurring in the context of stabilizing quantum information with a quantum error correcting code or in the context of fault tolerant quantum computing. Emphasis is made on the case of characterizing errors in surface codes and analogous architectures that make use of low-rate codes with spatially local geometry since it is in this context that our methods will perform best, but the method is much more general. In some embodiments, the disclosed systems and methods work by using dynamical decoupling [12] and randomized compiling [13] to ensure that the noise on the gates is Pauli, using randomized benchmarking [2, 3] to ensure that gate errors are decorrelated from state preparation and measurement errors (SPAM), and then using sparse probabilistic graphical models [14] to characterize the noise correlations. When the approximate correlation structure is known in advance, and the correlations are local, this procedure works efficiently to high precision. The correlation structure can be dynamically inferred as well, at additional computational cost. The result is a global description of a correlated Pauli error model that describes the noise of the quantum device in the form of a Bayesian network or a Gibbs random field where the underlying Markov network is a sparse graph.

Once the noise is characterized, the threshold for this code can be mapped to the phase transition of an associated Ising model. This makes estimation of the threshold amenable to Monte Carlo methods that avoid implementing the optimal maximum likelihood (ML) decoder. Thus, one does not need to propose a specific decoder or implement the ML decoder to estimate the threshold.

At the same time, the present disclosure provides a recipe for how to implement the maximum likelihood decoder using tensor networks in a way that is more efficient than the nave algorithm when applied to topological codes. Moreover, the disclosed implementations admit a sequence of approximations to the optimal decoder that run efficiently and have good practical performance [15]. However, the present disclosure does not depend on this specific decoder and any decoder can be run on the inferred noise and compared with the optimal threshold, meaning that any additional design constraints can be added to the choice of decoder.

Lastly, heuristics are disclosed that can be applied to choose a good code for the given noise channel. In some cases this has led to dramatic improvements in threshold behavior, even when the adapted code was constrained by physical locality [16].

The optimizations here are described as efficient. However, in some embodiments they will not be efficient in the computer science sense of a polynomial-time algorithm in the worst case (unless conventional wisdom about complexity classes is drastically wrong). Despite this, they are efficient in the sense that they reduce each respective optimization stage to a well-studied problem where heuristics can be applied effectively in practice to find good solutions using only modest resources.

In the present disclosure the notation is as follows. Let $\mathbb{P}$ denote the group of Pauli operators acting on a physical qubit, and let $\mathcal{P} = \mathbb{P}/\langle i \rangle$ be the quotient of $\mathbb{P}$ modulo phases. The notation $\mathcal{P}_j$ or $\mathcal{P}_C$ is used to denote the Pauli group (modulo phases) acting respectively on the $j^{th}$ physical qubit or a set of physical qubits C.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a computer system topology 48 for constructing a model of the noise afflicting a quantum computer 64 comprising a plurality of qubits 102. Referring to FIG. 1, in typical embodiments, the topology includes an optimization computer system 100 that is in electronic communication with a quantum computer 64 comprising a plurality of qubits 102. In some embodiments the electronic communication between the optimization computer system 100 and the quantum computer system is over a communication network 106. In some embodiments, the optimization computer system 100 applies suitable quantum codes 62 to the quantum computer 64. In some embodiments, the optimization computer system 100 determines information about the state of the qubits 102 of the quantum computer 64 using one or more measurement devices 60.

For purposes of illustration in FIG. 1, the optimization computer system 100 is represented as a single computer that includes all of the functionality of the disclosed classical computer system. However, the disclosure is not so limited. The functionality of the optimization computer system 100 may be spread across any number of networked computers and/or reside on each of several networked computers. One of skill in the art will appreciate that a wide array of different computer topologies is possible for the analysis computer system 100 and all such topologies are within the scope of the present disclosure.

Figure 2:
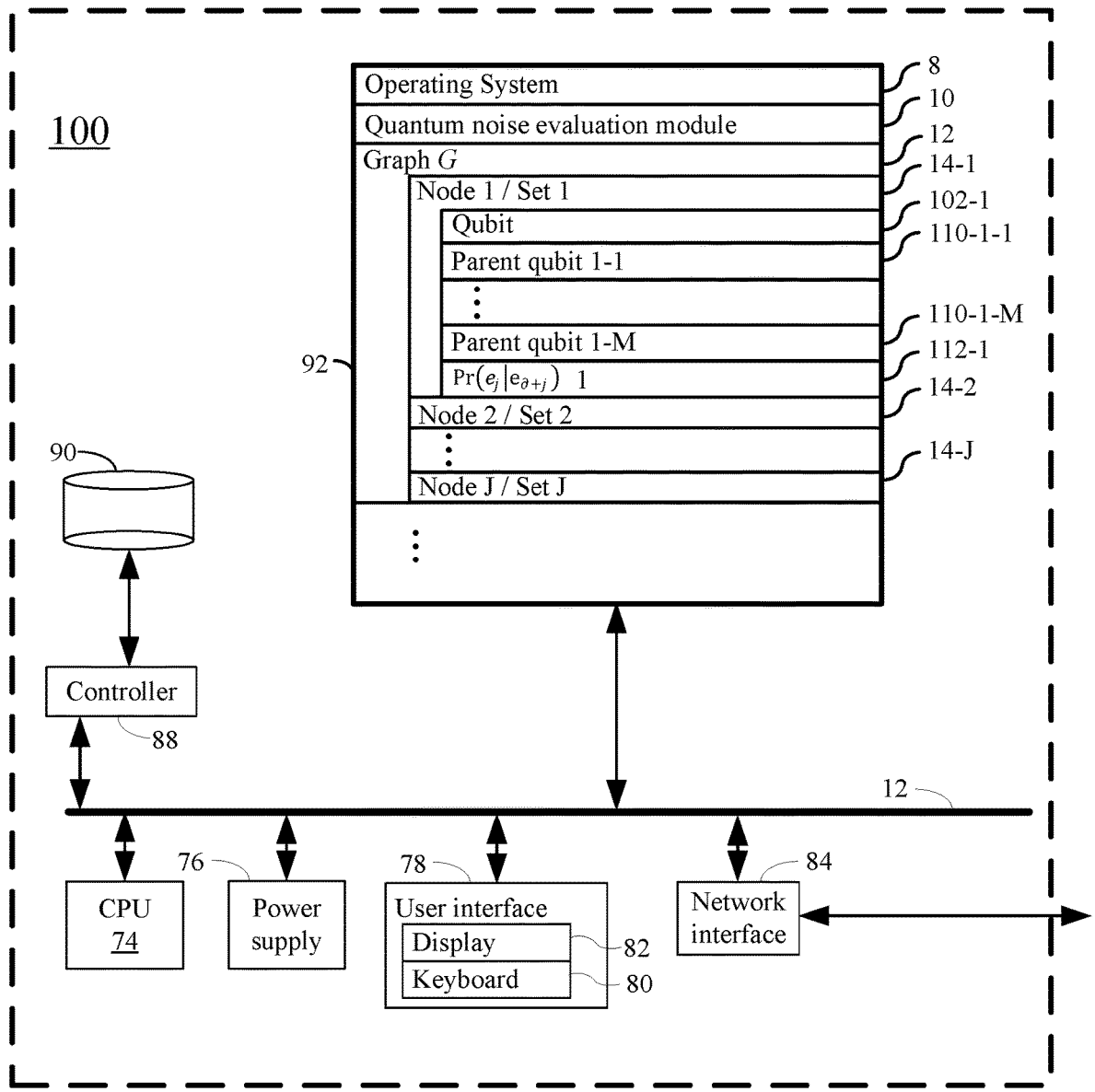
FIG. 2 is a schematic diagram of a classical computer system for constructing a model of the noise afflicting a quantum computer in accordance with an embodiment of the present disclosure.

Turning to FIG. 2 with the foregoing in mind, an analysis computer system 100 comprises one or more processing units (CPU's) 74, a network or other communications interface 84, a user interface 78 (e.g., including a display 82 and keyboard 80 or other form of input device) a memory 92 (e.g., random access memory), one or more magnetic disk storage and/or persistent devices 90 optionally accessed by one or more controllers 88, one or more communication busses 12 for interconnecting the aforementioned components, and a power supply 76 for powering the aforementioned components. Data in memory 92 can be seamlessly shared with non-volatile memory 90 using known computing techniques such as caching. Memory 92 and/or memory 90 can include mass storage that is remotely located with respect to the central processing unit(s) 74. In other words, some data stored in memory 92 and/or memory 90 may in fact be hosted on computers that are external to analysis computer system 100 but that can be electronically accessed by the analysis computer system over an Internet, intranet, or other form of network or electronic cable using network interface 84.

The memory 92 of analysis computer system 100 stores:
  an operating system 8 that includes procedures for handling various basic system services;
  a quantum noise evaluation module 10 for constructing a model of the noise afflicting a quantum computer comprising a plurality of qubits;
  a graph G 12 that describes a conditional independence structure of the noise, where the graph G includes a node 14 for each qubit 102 in the plurality of qubits and where the noise afflicting the quantum computer is logically reduced to Pauli noise, and further sets, where each respective set Cj in the plurality of sets (i) corresponds a respective qubit j 102 in the plurality of qubits and (ii) comprises a representation of the respective qubit j and the parent qubits $\partial^+ j$ 110 in the graph G.

In some implementations, one or more of the above identified data elements or modules of the analysis computer system 100 are stored in one or more of the previously disclosed memory devices, and correspond to a set of instructions for performing a function described above. The above identified data, modules or programs (e.g., sets of instructions) need not be implemented as separate software programs, procedures or modules, and thus various subsets of these modules may be combined or otherwise re-arranged in various implementations. In some implementations, the memory 92 and/or 90 optionally stores a subset of the modules and data structures identified above. Furthermore, in some embodiments the memory 92 and/or 90 stores additional modules and data structures not described above.

Now that a system for constructing a model of the noise afflicting a quantum computer comprising a plurality of qubits, have been disclosed, methods for constructing the model are disclosed below with reference to FIG. 3.

Block 202—Efficient error estimation via graphical models. There are two main types of graphical models 12 that are of interest in the present disclosure: Bayesian networks and Gibbs random fields. As such, in some embodiments graph G is a Bayesian network. In some alternative embodiments graph G is a Markov network (block 206). Both are examples of using graphs to encode the conditional dependencies in the correlations of a classical probability distribution. A Bayesian network (BN) represents the correlations as a directed acyclic graph, while a Gibbs random field is an undirected graph. When the graph of correlations is spatially local, the types of correlations that can be represented by these graphs can be learned efficiently [14], so it is not so important which formalism is used in the present disclosure. In fact, in some embodiments, a more general factor graph formulation is used to model the noise afflicting a quantum computer 64. The Bayesian network framework is more natural for the task of error estimation, so this form of graph G will be addressed in more detail below. In some embodiments, graph G is any other factor graph[51].

When the underlying graph 12 is the complete graph, then there are no assumptions being made about the noise correlations, whereas graphs with fewer edges impart more structural assumptions about the noise. The more edges that one can assume are unneeded, or justify aren't needed from data, the simpler the resulting inference task is, and the simpler the remaining optimization steps are.

As used herein, the term "Bayesian network" means a directed acyclic graph G whose nodes are labeled by conditional probability distributions that depend only on the parents nodes in the graph.

By construction, the Bayesian network has the feature that any node 14 is conditionally independent of its nondescendants given its parents. In particular, this implies that the global joint probability distribution factorizes into the form $$Pr(X_1, X_2, \ldots, X_n) = \prod_k Pr(X_k \mid X_{\partial^+ k}), \tag{1}$$

where $\partial^+ k$ denotes the parents 112 of node k. If the graph G is such that each node 14 has a small O(1), or O(log n), number of parents, and an experimenter has access to each node 14 in the graph 12, then every constituent conditional probability distribution can be learned, for example in a naïve way by simply sampling. Thus, inferring the Bayesian network can be accomplished. By itself, this observation is not yet applicable to the setting of characterizing errors in quantum devices. There are several issues that must be addressed:

(i) general errors can be coherent, and coherent errors cannot be represented as classical probability distributions over Pauli errors;

(ii) sampling the errors directly will conflate the state preparation and measurement (SPAM) errors into the estimates of the bare environmental errors and the gate errors, creating an unavoidable noise floor [17]; and (iii) Even if the noise is promised to be a Pauli channel, the graph G might not reflect the actual correlation structure that is present in the error distribution.

In some embodiments, the present disclosure addresses points (i) and (ii) independently from point (iii). Therefore, for the moment the point (iii) is set aside and the assumption is made that the graph G 12 is fixed, known, and at least approximately accurate as a model of the correlations in the noise of a Pauli channel afflicting a quantum computer. Below, embodiments in which the graph structure is learned as well are addressed.

To address the first point (general errors can be coherent, and coherent errors cannot be represented as classical probability distributions over Pauli errors), the methods of dynamical decoupling [12] and randomized compiling [13] are used in some embodiments. In some embodiments, the techniques disclosed in U.S. patent application Ser. No. 15/882,300 entitled "Systems and Methods for Quantum Computation Using Random Compiling," filed Jan. 25, 2018, which is hereby incorporated by reference are used in some embodiments.

Both dynamical decoupling and randomized compiling are designed to reduce coherent errors until they form a negligible part of the overall error budget. The particular feature that we is used in the present disclosure is the Pauli-twirling property, namely, if an arbitrary quantum channel is pre- and post-multiplied by the same random Pauli operator, then the resulting composite noise channel is in expectation a Pauli channel, and moreover it has the same channel fidelity to the identity as the original channel. Thus, by building random Pauli operators into the circuits (which, for instance referring to FIG. 1, are applied to the quantum computer 64 as quantum code 62), the noise afflicting the quantum computer can be projected into the form of a Pauli channel without loss of fidelity. Importantly, this includes the identity gate so that any environmental couplings can also be reduced to Pauli errors on the quantum computer 64.

To address point (ii) from above (sampling the errors directly will conflate the state preparation and measurement (SPAM) errors into the estimates of the bare environmental errors and the gate errors, creating an unavoidable noise floor), in some embodiments, the main idea of randomized benchmarking [2, 3] is used, which is to decouple the SPAM errors from any environmental or gate errors in the system by considering long sequences of gates and using regression to infer small error rates from decay rates. Thus, in some embodiments, the techniques disclosed in U.S. Patent Application No. 62/535,953, entitled "Systems and Methods for Local Randomized Benchmarking," filed Aug. 1, 2017, which is hereby incorporated by reference, are used. The way this works in conjunction with the Pauli twirling from above depends on the type of noise that one wishes to protect against. Two archetypical scenarios are considered: noisy environmental coupling and noisy syndrome extraction.

In the environmental coupling scenario, the goal is to stabilize a quantum computer 64 in the form of a quantum memory that is in contact with an environment. Because every time step of the device is being Pauli twirled, one has reduced the task to characterizing the incoherent Pauli errors that result from this coupling.

In the noisy syndrome extraction scenario, one is additionally performing sequences of local Clifford gates and Pauli measurements on the device. In such embodiments, both Pauli twirling and randomized compiling can be used. There is no essential restriction to these two scenarios, and the method also works on other typical tasks, such as applying logical Clifford gates.

Referring to block 210 of FIG. 3, the protocol in accordance with an embodiment of the present disclosure is now stated more formally. Recall that we already have a graph G 12 that describes the conditional independence structure of the noise afflicting the quantum computer 64 and the noise is guaranteed to be Pauli by the application of Pauli twirling. First the graph 12 is broken into a sequence of sets $C_j$ 14, one for each qubit j 102, comprising that qubit and its parents $\partial^+ j$. For every set $C_j$, the conditional probability distribution $Pr(e_j|e_{\partial+j})$ 112 is characterized, where $e_j \in \mathcal{P}_j$ is a Pauli error on the $j^{th}$ qubit. This local distribution is over all possible Pauli errors on $C_j$ or a subset thereof, so to learn this efficiently, in preferred embodiments, the Bayesian network is sparse in the sense that each node 14 has only a constant number of parents (or at most logarithmic in n, the number of qubits 102 in the quantum computer 64). This is a natural assumption if the architecture of the quantum computer 64 has a spatially local geometry, as long range dependencies are typically suppressed.

Referring to block 212 of FIG. 3, the method continues by, for each respective set Cj in the plurality of sets, characterizing a corresponding local conditional probability distribution $Pr(e_j|e_{\partial+j})$, where $e_j \in \mathcal{P}_j$ is a Pauli error on the $j^{th}$ qubit, by a first procedure that comprises estimating a local Pauli fidelity for the respective set Cj thereby learning the model of the noise afflicting the quantum computer.

In some such embodiments, for each set $C_j$, the following procedure is repeated. Pick a stabilizer group S and prepare (an approximation of) the eigenstate $|\psi\rangle = S_k |\psi\rangle$ for all $S_k \in S$. Then apply the Pauli-twirled noise map ε that you wish to characterize m times. Then measure the projection into that stabilizer basis. The individual probabilities are mixtures of multiple exponentials, one for each of the possible eigenvalues. However, a Walsh-Hadamard transformation on these data will transform them each into the fidelity decay curve $A_k p_k^m$, which one gets from the standard randomized benchmarking fidelity decay argument. These can then be reconstructed accurately using regression, and the process can be repeated for multiple stabilizer groups to get each possible Pauli error. This procedure outputs an accurate estimate of $Pr(eC_j)$, the marginal distribution of Pauli errors on $C_j$. To obtain $Pr(e_j|e_{\partial+1})$, and hence the entire Bayesian Network, we can simply use the law of conditional probability, $Pr(e_j|e_{\partial+1}) = Pr(e_{c_j})/Pr(e_{\partial+1})$. Hence, we have learned a complete, SPAM-free, and accurate description of the BN. This is a very straightforward reconstruction method, but it is probably not the most accurate. Because the likelihood function factorizes over the $C_j$, it may be possible to do direct maximum likelihood on each factor instead. The optimization splits into independent optimizations. Another possibility is the use of conjugate priors as a way to update knowledge of the Pauli errors, potentially using the case of independent noise estimated from the single-qubit marginals as an initial guess for the prior.

In fact, any procedure for estimating local Pauli fidelities can be used. For instance, in some embodiments, the procedure for estimating local Pauli fidelities is computed as disclosed in co-pending U.S. provisional patent application No. 62/639,986, entitled "Systems and Methods for Reconstructing Noise from Pauli Fidelities," filed Mar. 7, 2018, which is hereby incorporated by reference.

If instead the correlation structure is not known in advance, the powerful tools of structure learning can be used to infer the structure from the data. There are multiple ways to do this. In one such approach, one defines a structure score for each possible graph G based on how well the data agree with the best fit model within a given G, minus any penalties for overfitting that would arise, for example, by adding too many edges. Popular ways to do this include using a likelihood score penalized by an information criterion such as the Bayesian or Akaike information criterion. Because there are $2^{O(n^2)}$ possible structure graphs, the second ingredient is to implement heuristics and utilize prior information about the noise to search over possible structures. Given that we are primarily interested in local correlations, one could search through graphs that add successively more edges in neighborhoods of increasing radius around each node. This could be augmented by simulated annealing methods that apply local graph moves such as adding, deleting, swapping, or reversing edges. If a move improves the structure score, then accept it, and otherwise accept the move with some probability as the score worsens (akin to the Metropolis algorithm) to help escape local minima.

The procedures described above allow for characterization of correlated local degrees of freedom, but in topological codes, the quantum information is encoded in global degrees of freedom. A logical subspace must use more conventional characterization techniques, but if one is interested only in logical Pauli fidelities, then logical randomized benchmarking is one option.

Referring to block 214, in some embodiments efficient threshold estimation (e.g., via Monte Carlo search) is performed. That is, once one has obtained an estimate of the effective Pauli noise using the methods in the previous section, a determination of the best possible performance of a given code and fault-tolerance scheme can be made using the disclosed techniques. To achieve this in accordance with some embodiments, we map the problem of finding the threshold to a known problem in the statistical physics of lattice gauge theory for characterizing the phase boundaries of such systems, and conversely, the noise generated by this protocol defines and motivates the study of new families of lattice gauge theories.

In some embodiments, such mapping is in accordance with Chubb & Flammia [20], which generalizes earlier work by Dennis et al. [21], Andrist et al. [22], and Bombin et al. [23] on independent noise. In the context of independent bit-flip or depolarizing noise, this method has been used to find the code capacity thresholds and (in some cases) fault tolerant memory thresholds for toric codes [21, 24, 25], color codes [22, 23, 26-30] and even general quantum low-density parity-check codes [31]. The primary innovation of [20] is to generalize this approach to deal with arbitrary correlations in Pauli channels.

In some embodiments, the case of a Gibbs random field representation of the noise correlations is used since this makes the connections with the physics of lattice gauge theories clearer. In some embodiments, some other convenient assumptions are made for simplicity of presentation, such as that the physical system under consideration consists of qubits. However, the result is much more general.

In some embodiments, the mapping proceeds as follows. For $\sigma, \tau \in \mathbb{P}_C$, we define $\chi_\sigma(\tau) = \pm 1$ to be the solution the equation $\sigma \tau \sigma^\dagger = \chi_\sigma(\tau)\tau$. Because the definition is invariant under rephasing, the value of $\chi_\sigma(\tau)$ depends only on the equivalence class of σ and τ in $P_C$. For every stabilizer $S_k$ we associate an Ising spin $s_k$, and for any Pauli error a we define $n(\sigma) = \{k: \chi_\sigma(S_k) = -1\}$, the set of stabilizers that anticommute with that error a. For the set of possible errors $e_j \in P_j$ on the jth physical qubit, we associate the following ensemble of Hamiltonians.

Suppose that the Pauli noise correlations are, after the estimation procedure in the previous section, given by a Gibbs random field with clique potentials $\phi_C$ for each maximal clique C in the graph G. We define a Hamiltonian with a coupling term for every possible error in each clique, $$H_e(s) = -\sum_C \sum_{\sigma \in \mathcal{P}_C} J_C(\sigma)\chi_\sigma(e) \prod_{\kappa \in n(\sigma)} s_k \qquad (2)$$

(If a Bayesian network was used instead, then the maximal cliques C can be replaced with the sets $C_j$ consisting of the node j and its parents ∂+j). Thus, the presence or absence of an error $e_j$ on the $j^{th}$ qubit moderates the signs of the coupling terms. When the following condition, known as the Nishimori condition, holds $$\beta J_C(\sigma) = \frac{1}{|P_c|}\sum_{\tau \in P_c} \chi_\sigma(\tau)\log\phi(\tau), \qquad (3)$$

then this ensemble of Hamiltonians has enhanced symmetry. The so-called fundamental theorem of this mapping is the result that when Eq. (3) holds, then the partition function $Z_e = \exp \Sigma_S[-\beta H_e(s)]$ satisfies:

$$Z_e = Pr(\bar{e}), \qquad (4)$$

where $Pr(\bar{e}) = \Sigma_S Pr(Se)$ is the probability, according to the Gibbs random field, of the logical class of the error e given the syndrome (where the sum is over all elements of the stabilizer group).

This ensemble of Hamiltonians has a special symmetry, namely if one of the errors is multiplied by a stabilizer R then this is equivalent to flipping the associated spin configurations, $H_{Re}(s) = H_e(sr)$, where the multiplication is pointwise. In the case where the code is a topological code on a lattice, then all of the stabilizer generators are local operators, and then the family of Hamiltonians becomes a (disordered) lattice gauge theory [32].

This ensemble of partition functions can be organized more succinctly in a partition function, $$\mathcal{Z} = \sum_e Pr(e)Z_e. \qquad (5)$$

By the Hammersley-Clifford theorem [33], as long as the errors have positive density (meaning that any error has a nonzero probability of occurring) then the correlations factorize and can be written as the Gibbs state of a local Hamiltonian of variables whose coupling geometry follows the geometry of the graph G. Then we can define $\mu H(e) = \log Pr(e)$, where H(e) couples only spins in the maximal cliques of G. Then we have $$\mathcal{Z} = \sum_{e,s} \exp[\mu H(e) - \beta H_e(s)]. \qquad (6)$$

The importance of this result is that calculating thresholds for quantum codes and fault tolerance schemes can now be mapped to the problem of detecting phase transitions in lattice gauge theories. Suppose the sequence of codes has the classic first-order phase transition behavior, where below a threshold error rate the information is perfectly preserved in the limit of large code size, and above the threshold no information can be reliably transmitted. From either Eq. (4) or (6) this corresponds to the phase boundary (within the Nishimori surface) in the lattice gauge theory. More precisely, under the assumption of a unique phase transition point it can be shown [20, 30] that the average free energy cost of introducing a logical error into the code diverges exactly where the maximum likelihood decoder success probability vanishes. Conversely, if the code is above the threshold in the sense that each logical operator has some uniformly bounded probability for each syndrome, then the free energy cost for any logical operator is finite.

Many algorithms exist for estimating phase diagrams in classical statistical models [34], including innumerable variations of Monte Carlo methods. Prior work studying quantum codes has made extensive use of parallel tempering Monte Carlo, but other choices would work as well. The point here is not to suggest a specific algorithm, but rather to show that the threshold estimation problem for the optimal (maximum likelihood) decoder can be easily studied by a wide range of well-studied methods. This means that it is possible to obtain accurate estimates of the best possible performance of a code, fault tolerance scheme, and decoder. This provides an important benchmark for the practical heuristic methods that we develop in the next section.

Efficient near-optimal decoding via tensor networks. We have seen how the optimal threshold is given by a certain partition function. This insight has another important ramification: it enables any method for estimating partition functions or the differences of free energies (equivalently, ratios of partition functions) of classical statistical models to act as an approximation to the maximum likelihood decoder.

First imagine the standard decoding scenario where one measures a syndrome y and wishes to infer the most likely error class, which by the fundamental theorem is equivalent to finding $$L^\star = \underset{L}{\mathrm{argmax}}\, Z_{Le_y}, \qquad (7)$$

where the maximization is over a representative L from each logical class, the $e_y$ is any error that is consistent with the given syndrome. Such an error can always be found efficiently for stabilizer codes. If the code has a rate at most O(log n), then there are only poly(n) choices of L to optimize over, and topological codes are typically restricted to have O(1), so this can be done efficiently. Supposing the solution to Eq. (7) has been found, an optimal recovery operation is given by $L^\star e_y$.

As before with threshold estimation, there are numerous ways to approach this problem of estimation partition functions. Again, Monte Carlo methods can be used to estimate $Z_{Le_y}/Z_{e_y}$, but here we explain how tensor network methods [35] can be used to give provable speedups over brute force maximum likelihood decoding. Tensor network decoders were first discussed by Bravyi, Suchara & Vargo [15] in the context of the surface code, but the idea applies to any partition function of a local model.

Fix an error e, and for each term $h_e(s_C)$ supported on a clique C in the Gibbs random field inferred above, we associate a tensor of order |C| given by $$W_e(S_c) = \exp(-\beta h_e(s_C)) \qquad (8)$$

Now we add the so-called unit tensor for each spin $s_k$ and contract along the appropriate edges everywhere that $s_k$ k appears in one of the $W_C$. The unit tensor $U_k$ for the kth spin is the tensor with a leg taking values $\{0,1\}$ for every interaction that $s_k$ participates in, and returns zero unless all the inputs are equal (this generalizes the identity matrix to higher order tensors). This tensor network, call it $TN_e(W_C, U_k)$, has a contraction value equal to $Z_e$ by construction. An analogous construction creates a tensor network for Z as well.

At this point, the problem has been reduced to a problem of contracting a set of tensor networks, and many algorithms have been developed for this purpose, such as the matrix product state (MPS) (or more generally, projected pair entangled state) boundary contraction [15], tensor renormalization group [36, 37], and tensor network renormalization [38-41]. It is also noteworthy that even more general noise frameworks are possible to decode using these ideas [42].

There are at least two reasons to highlight tensor network decoders. The first is that for the important case of topological codes, the runtime of these decoders gives an exact implementation of the maximum likelihood decoder using far fewer resources. The MPS boundary contraction method applied to a d-dimensional topological code with L qubits on each side, for a total of $n=L^d$ qubits, can be implemented in time $2^{O(n/L)}$ instead of $2^{O(n)}$. Moreover, by truncating the bond dimension of the tensor network we obtain approximations to the optimal decoder that require only O poly(b)n time where b is the bond dimension. In Refs. [15, 16], small values of b (around 6-48) were observed to give nearly optimal performance by a convergence analysis, so the constants hidden in the rough complexity analysis above are not prohibitive. For T rounds of fault tolerant decoding, the naïve decoder takes time $2^{O(nT)}$ and the exact tensor network construction reduces this to $2^{O(nT/X)}$, where X=max $\{L, T\}$.

Of course, tensor network decoders also have drawbacks, and there is no single "best" decoder when realistic constraints such as embeddability in local hardware come into play. Therefore, we stress that any method of decoding can be used at this stage to compare to the optimal threshold found in the previous stage.

Tailoring codes to noise models. Prior work has demonstrated a clear advantage to tailoring a quantum code to a specific noise channel [16, 43-48]. Remarkably, this remains true even when the code is constrained by physical concerns to have low-weight stabilizer generators [48], spatial locality [16], or mode structure [47]. One further layer of optimization that can be applied here is to repeat the threshold estimation and decoder performance optimization stages for a sequence of codes that are adapted to the noise. Here the course of action is less clear, as this topic is mostly in its infancy. We wish to search over the space of physically reasonable codes in any manner that has some heuristic notion of "gradient" that will point us in the direction of small local optimizations that will likely find better code performance. It is unclear how to make this notion more precise, but we can nonetheless suggest some heuristics that have emerged as plausible ways to aid in finding better codes. We will highlight several design principles in topological codes that have been used in the past to improve threshold performance or decrease the logical error rate when below threshold. Some of these are quite passive changes that will likely not affect the noise characterization phase, while others will require repeating the noise characterization again.

Perhaps the simplest change that can be made is a local change of basis on each qubit to maximize the marginal probability that a local error will create a syndrome, preferably one with high weight. In Ref [16], this idea was exploited to show that the threshold can increase up to four fold in the surface code when the noise is dominated by dephasing. This basis change can be done in software, of course, by just rotating the stabilizers in an appropriate fashion. It is not yet clear what gains are possible for realistic noise models or when fault tolerance is taken into account.

Another possibility is to exploit boundary conditions and physical layout. For example, is known that a simple rotated layout of the surface code will double the distance of the code when using the same number of physical qubits. An optimization tool has been developed for the purpose of optimizing this sort of criterion of distance per qubit [49], but it will likely be that changing the physical layout of the qubits will change the underlying noise model, which would necessitate returning to the characterization stage. The same code on a slightly different lattice can also influence the threshold, and some intuition for how to choose this can be garnered from using the statistical mechanical mapping.

Lastly, the most obvious optimization is to use genuinely different codes. As long as the physical layout remains constant, then the bare noise model should be the same irrespective of the code. Haah [50] has a particularly nice formalism for describing translation invariant codes that would facilitate searching through topological stabilizer codes to find one that maximizes the noise-specific code threshold. However, in the context of fault tolerance, the specific measurement of the new syndromes will necessarily be different, and the resultant new correlation structure will necessitate repeating the noise characterization.

CONCLUSION AND REFERENCES CITED

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a nontransitory computer readable storage medium. For instance, the computer program product could contain the program modules shown in any combination of FIG. 1 or 2 or described in FIG. 3. These program modules can be stored on a CD-ROM, DVD, magnetic disk storage product, USB key, or any other non-transitory computer readable data or program storage product.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

[1] John M Martinis, "Qubit metrology for building a fault-tolerant quantum computer," npj Quantum Information 1, (2015), arXiv:1510.01406.

[2] Joseph Emerson, Robert Alicki, and Karol Życzkowski, "Scalable noise estimation with random unitary operators," J. Opt. B 7, S347 (2005), quant-ph/0503243.

[3] E. Knill, D. Leibfried, R. Reichle, J. Britton, R. B. Blakestad, J. D. Jost, C. Langer, R. Ozeri, S. Seidelin, and D. J. Wineland, "Randomized benchmarking of quantum gates," Phys. Rev. A 77, 012307 (2008), arXiv:0707.0963.

[4] Steven T. Flammia and Yi-Kai Liu, "Direct fidelity estimation from few Pauli measurements," Phys. Rev. Lett. 106, 230501 (2011), arXiv:1104.4695.

[5] M. P. da Silva, 0. Landon-Cardinal, and D. Poulin, "Practical characterization of quantum devices without tomography," Phys. Rev. Lett. 107, 210404 (2011), arXiv:1104.3835.

[6] David Gross, Yi-Kai Liu, Steven T. Flammia, Stephen Becker, and Jens Eisert, "Quantum state tomography via compressed sensing," Phys. Rev. Lett. 105, 150401 (2010), arXiv:0909.3304.

[7] S. T. Flammia, D. Gross, Y.-K. Liu, and J. Eisert, "Quantum tomography via compressed sensing: Error bounds, sample complexity, and efficient estimators," New J. Phys. 14, 095022 (2012), arXiv:1205.2300.

[8] A. Shabani, R. L. Kosut, M. Mohseni, H. Rabitz, M. A. Broome, M. P. Almeida, A. Fedrizzi, and White, "Efficient measurement of quantum dynamics via compressive sensing," Phys. Rev. Lett. 106, 100401 (2011), arXiv:0910.5498.

[9] Shelby Kimmel, Marcus P. da Silva, Colm A. Ryan, Blake R. Johnson, and Thomas Ohki, "Robust extraction of tomographic information via randomized benchmarking," Phys. Rev. X 4, 011050 (2014), arXiv:1306.2348.

[10] Robin Blume-Kohout, John King Gamble, Erik Nielsen, Kenneth Rudinger, Jonathan Mizrahi, Kevin Fortier, and Peter Maunz, "Demonstration of qubit operations below a rigorous fault tolerance threshold with gate set tomography," Nature Communications 8, (2016), arXiv:1605.07674.

[11] Marcus Cramer, Martin B. Plenio, Steven T. Flammia, Rolando Somma, David Gross, Stephen D. Bartlett, Olivier Landon-Cardinal, David Poulin, and Yi-Kai Liu, "Efficient quantum state tomography," Nat Commun 1, 149 (2010), arXiv:1101.4366.

[12] Lorenza Viola, Emanuel Knill, and Seth Lloyd, "Dynamical decoupling of open quantum systems," Phys. Rev. Lett. 82, 2417-2421 (1999), quant-ph/9809071.

[13] Joel J. Wallman and Joseph Emerson, "Noise tailoring for scalable quantum computation via randomized compiling," Phys. Rev. A 94, 052325 (2016), arXiv:1512.01098.

[14] Daphne Koller and Nir Friedman, *Probabilistic graphical models: principles and techniques* (MIT Press, Cambridge, Mass., 2009).

[15] Sergey Bravyi, Martin Suchara, and Alexander Vargo, "Efficient algorithms for maximum likelihood decoding in the surface code," Phys. Rev. A 90, 032326 (2014), arXiv:1405.4883.

[16] David K. Tuckett, Stephen D. Bartlett, and Steven T. Flammia, "Ultrahigh error threshold for surface codes with biased noise," Phys. Rev. Lett. 120, 050505 (2018), arXiv:1708.08474.

[17] Seth T. Merkel, Jay M. Gambetta, John A. Smolin, S. Poletto, A. D. Corcoles, B. R. Johnson, Colm A. Ryan, and M. Steffen, "Self-consistent quantum process tomography," Phys. Rev. A 87, 062119 (2013), 1211.0322.

[18] Michael R. Geller and Zhongyuan Zhou, "Efficient error models for fault-tolerant architectures and the pauli twirling approximation," Phys. Rev. A 88, 012314 (2013), arXiv:1305.2021.

[19] Amara Katabarwa and Michael R. Geller, "Logical error rate in the pauli twirling approximation," Scientific Reports 5, 14670 (2015).

[20] Christopher T Chubb and Steven T. Flammia, "Stat mech mappings for any code and channel," in preparation (2018).

[21] Eric Dennis, Alexei Kitaev, Andrew Landahl, and John Preskill, "Topological quantum memory," J. Math. Phys. 43, 4452-4505 (2002), quant-ph/0110143.

[22] Ruben S. Andrist, Helmut G. Katzgraber, H. Bombin, and M. A. Martin-Delgado, "Tricolored lattice gauge theory with randomness: fault tolerance in topological color codes," New Journal of Physics 13, 083006 (2011), arXiv:1005.0777.

[23] H. Bombin, Ruben S. Andrist, Masayuki Ohzeki, Helmut G. Katzgraber, and M. A. Martin-Delgado, "Strong resilience of topological codes to depolarization," Physical Review X 2, 021004 (2012), arXiv:1202.1852.

[24] Koujin Takeda and Hidetoshi Nishimori, "Self-dual random-plaquette gauge model and the quantum toric code," Nuclear Physics B 686, 377-396 (2004), hep-th/0310279.

[25] Takuya Ohno, Gaku Arakawa, Ikuo Ichinose, and Tetsuo Matsui, "Phase structure of the random-plaquette $Z_2$ gauge model: accuracy threshold for a toric quantum memory," Nuclear Physics B 697, 462-480 (2004), arXiv:quant-ph/0401101.

[26] Helmut G. Katzgraber, H. Bombin, and M. A. Martin-Delgado, "Error threshold for color codes and random three-body ising models," Physical Review Letters 103, 090501 (2009), arXiv:0902.4845.

[27] Ruben S. Andrist, H. Bombin, Helmut G. Katzgraber, and M. A. Martin-Delgado, "Optimal error correction in topological subsystem codes," Phys. Rev. A 85, 050302 (2012), arXiv:1204.1838.

[28] Ruben S. Andrist, Helmut G. Katzgraber, H. Bombin, and M. A. Martin-Delgado, "Error tolerance of topological codes with independent bit-flip and measurement errors," Phys. Rev. A 94, 012318 (2016), arXiv:1603.08729.

[29] H. G. Katzgraber and R. S. Andrist, "Stability of topologically-protected quantum computing proposals as seen through spin glasses," Journal of Physics: Conference Series 473, 012019 (2013), arXiv:1306.0540.

[30] Aleksander Kubica, Michael E. Beverland, Fernando Brandao, John Preskill, and Krysta M. Svore, "Three-dimensional color code thresholds via statistical-mechanical mapping," (2017), arXiv:1708.07131.

[31] Alexey A. Kovalev and Leonid P. Pryadko, "Spin glass reflection of the decoding transition for quantum error correcting codes," Quantum Info. Comput. 15, 825-852 (2015), arXiv:1311.7688.

[32] John B. Kogut, "An introduction to lattice gauge theory and spin systems," Rev. Mod. Phys. 51, 659-713 (1979).

[33] J. M. Hammersley and P. Clifford, "Markov fields on finite graphs and lattices," (1971), available at http://www.statslab.cam.ac.uk/~grg/books/hammfest/hamm-cliff.pdf.

[34] David P. Landau and Kurt Binder, *A guide to Monte Carlo simulations in statistical physics* (Cambridge University Press, Cambridge N.Y., 2009).

[35] F. Verstraete, J. I. Cirac, and V. Murg, "Matrix product states, projected entangled pair states, and variational renormalization group methods for quantum spin systems," Advances in Physics 57, 143 (2008), arXiv:0907.2796.

[36] Michael Levin and Cody P. Nave, "Tensor renormalization group approach to two-dimensional classical lattice models," Physical Review Letters 99, 120601 (2007), cond-mat/0611687.

[37] Z. Y. Xie, J. Chen, M. P. Qin, J. W. Zhu, L. P. Yang, and T. Xiang, "Coarse-graining renormalization by higher-order singular value decomposition," Physical Review B 86, 045139 (2012), arXiv:1201.1144.

[38] Glen Evenbly and Guifre Vidal, "Tensor Network Renormalization," Physical Review Letters 115, 180405 (2015), arXiv:1412.0732.

[39] Shuo Yang, Zheng-Cheng Gu, and Xiao-Gang Wen, "Loop optimization for tensor network renormalization," Phys. Rev. Lett. 118, 110504 (2017), arXiv:1512.04938.

[40] M. Bal, M. Marten, J. Haegeman, and F. Verstraete, "Renormalization group flows of hamiltonians using tensor networks," Phys. Rev. Lett. 118, 250602 (2017), arXiv:1703.00365.

[41] Markus Hauru, Clement Delcamp, and Sebastian Mizera, "Renormalization of tensor networks using graph-independent local truncations," Phys. Rev. B 97, 045111 (2018), arXiv:1709.07460.

[42] Andrew S. Darmawan and David Poulin, "Tensor-network simulations of the surface code under realistic noise," Phys. Rev. Lett. 119, 040502 (2017), arXiv:1607.06460.

[43] D. W. Leung, M. A. Nielsen, I. L. Chuang, and Y. Yamamoto, "Approximate quantum error correction can lead to better codes," Phys. Rev. A 56, 2567 (1997), quant-ph/9704002.

[44] D. Gottesman, A. Kitaev, and J. Preskill, "Encoding a qubit in an oscillator," Phys. Rev. A 64, 012310 (2001), quant-ph/0008040.

[45] Mazyar Mirrahimi, Zaki Leghtas, Victor V Albert, Steven Touzard, Robert J Schoelkopf, Liang Jiang, and Michel H Devoret, "Dynamically protected cat-qubits: a new paradigm for universal quantum computation," New J. Phys. 16, 045014 (2014), arXiv:1312.2017.

[46] Marios H. Michael, Matti Silveri, R. T. Brierley, Victor V. Albert, Juha Salmilehto, Liang Jiang, and S. M. Girvin, "New class of quantum error-correcting codes for a bosonic mode," Phys. Rev. X 6, 031006 (2016), arXiv:1602.00008.

[47] Victor V. Albert, Kyungjoo Noh, Kasper Duivenvoorden, R. T. Brierley, Philip Reinhold, Christophe Vuillot, Linshu Li, Chao Shen, S. M. Girvin, Barbara M. Terhal, and Liang Jiang, "Performance and structure of bosonic codes," (2017), arXiv:1708.05010.

[48] Alan Robertson, Christopher Granade, Stephen D. Bartlett, and Steven T. Flammia, "Tailored codes for small quantum memories," Phys. Rev. Applied 8, 064004 (2017), arXiv:1703.08179.

[49] Nicolas Delfosse, Pavithran Iyer, and David Poulin, "A linear-time benchmarking tool for generalized surface codes," (2016), arXiv:1611.04256.

[50] Jeongwan Haah, "Commuting Pauli Hamiltonians as maps between free modules," Comm. Math. Phys. 324, 351-399 (2013), arXiv:1204.1063.

[51] Brenden J. Frey, Hans-Andrea Leoliger, Frank R. Kschischang, and Niclas Wiberg, "Factor Graphs and Algorithms," Proceedings of the Annual Allerton Conference on Communication Control and Computing, 35, 666-680 (1997).

What is claimed is:

1. A computer system for constructing a model of noise afflicting a quantum computer comprising a plurality of qubits, the computer system comprising:
one or more processors; and
a memory storing instructions that, when executed by the one or more processors, cause the one or more processors to:
obtain a graph G that describes a conditional independence structure of the noise, wherein the graph G includes a node for each qubit in the plurality of qubits and wherein the noise afflicting the quantum computer is logically reduced to Pauli noise;
break the graph G into a plurality of sets, wherein each set Cj in the plurality of sets (i) corresponds a qubit j in the plurality of qubits and (ii) comprises a representation of the qubit j and parent qubits $\partial + j$ in the graph G;
for each set Cj in the plurality of sets, characterize a corresponding local conditional probability distribution $Pr(e_j | e_{\partial + j})$, wherein $e_j \in \mathcal{P}_j$ is a Pauli error on the $j^{th}$ qubit, and $e_{\partial + j}$ is a Pauli error on the parent qubits of the $j^{th}$ qubit, by estimating a local Pauli fidelity for the set Cj thereby learning the model of the noise afflicting the quantum computer; and
estimate a performance of at least one fixed quantum error-correcting code on the quantum computer using the model of the noise afflicting the quantum computer.

2. The computer system of claim 1, wherein the instructions further cause the one or more processors to logically reduce the noise afflicting the quantum computer to Pauli noise by an application of Pauli twirling.

3. The computer system of claim 1, wherein:
the corresponding local conditional probability distribution comprises all possible Pauli errors on Cj or a subset thereof,
the graph G corresponds to a factor graph, and
each node in a plurality of nodes of the graph G has a constant number of parent qubits.

4. The computer system of claim 3, wherein the factor graph is a Bayesian network or a Markov network.

5. The computer system of claim 1, wherein the graph G corresponds to a Bayesian network or a Markov network, and
wherein each node in a plurality of nodes of the graph G independently has a number of parent qubits that is $O(\log(n))$ or less, wherein n is the number of qubits in the quantum computer.

6. The computer system of claim 1, wherein the estimating the local Pauli fidelity for the set Cj comprises:
(i) selecting a stabilizer group S in a plurality of stabilizer groups and preparing an approximation of an eigenstate $|\psi\rangle = S_k |\psi\rangle$ for all stabilizers $S_k \in S$, wherein $|\psi\rangle$ is the eigenstate and $S_k$ is the stabilizer,
(ii) applying a Pauli-twirled noise map $\varepsilon$ that is to be characterized m times, wherein m is a positive integer,
(iii) measuring a corresponding stabilizer basis, wherein each individual probability is a mixture of multiple exponentials, one for each possible eigenvalue in a plurality of eigenvalues,
(iv) applying a Walsh-Hadamard transformation on the measurement of the measuring (iii) thereby transforming the measurement into a fidelity decay curve using a randomized benchmarking fidelity decay argument,
(v) reconstructing a fidelity decay curve from the applying (iv) using regression, and
(vi) repeating the selecting (i), the applying (ii), the measuring (iii), the applying (iv), and the reconstructing (v) for each stabilizer group in the plurality of stabilizer groups thereby obtaining each possible Pauli error for Cj, and thereby obtaining an estimate of Pr(eCj), wherein Pr(eCj) is a marginal probability distribution of Pauli errors on Cj.

7. The computer system of claim 6, wherein the instructions further cause the one or more processors to obtain $Pr(e_j | e_{\partial + 1})$ using a conditional probability relation $Pr(e_j|e_{\partial+1}) = Pr(e_{C_j})/Pr(e_{\partial+1})$ thereby learning the model of the noise afflicting the quantum computer.

8. The computer system of claim 1, wherein estimating the performance of the at least one fixed quantum error-correcting code comprises mapping the at least one fixed quantum error-correcting code to an associated Ising model.

9. The computer system of claim 8, wherein estimating the performance of the at least one fixed quantum error-correcting code further comprises identifying a partition function that provides an optimal threshold for the at least one fixed quantum error-correcting code.

10. The computer system of claim 1, wherein the instructions further cause the one or more processors to:
decode the at least one fixed quantum error-correcting code, using the graph G, after the at least one fixed quantum error-correcting code has been applied to the quantum computer, wherein the decoding comprises contracting a set of tensor networks for the at least one fixed quantum error-correcting code.

11. The computer system of claim 1, wherein the instructions further cause the one or more processors to:
decode the at least one fixed quantum error-correcting code, using the graph G, after the at least one fixed quantum error-correcting code has been applied to the quantum computer, wherein the decoding comprises application of a Monte Carlo method for the at least one fixed quantum error-correcting code.

12. The computer system of claim 1, wherein the at least one fixed quantum error-correcting code in-comprises a plurality of fixed quantum error-correcting codes, and
wherein the instructions further cause the one or more processors to:
estimate a performance of each fixed quantum error-correcting code of the plurality of fixed quantum error-correcting codes on the quantum computer using the model of the noise afflicting the quantum computer, and
decode each fixed error-correcting code, using the graph G, after the fixed quantum error-correcting code has been applied to the quantum computer, thereby identifying an optimal fixed quantum error-correcting code in the plurality of fixed quantum error-correcting codes.

13. The computer system of claim 12, wherein decoding the at least one fixed quantum error-correcting code, using the graph G, after the at least one fixed quantum error-correcting code has been applied to the quantum computer, comprises contracting a set of tensor networks for the at least one fixed quantum error-correcting code.

14. The computer system of claim 12, wherein decoding the at least one fixed quantum error-correcting code, using the graph G, after the at least one fixed quantum error-correcting code has been applied to the quantum computer comprises application of a Monte Carlo method for the at least one fixed quantum error-correcting code.

15. A method for constructing a model of noise afflicting a quantum computer comprising a plurality of qubits at a computer system comprising one or more data processors and a memory, the memory comprising non-transitory instructions executable by the one or more data processors, the method comprising:
obtaining a graph G that describes a conditional independence structure of the noise afflicting the quantum computer, wherein the graph G includes a node for each qubit in the plurality of qubits and wherein the noise afflicting the quantum computer is logically reduced to Pauli noise;
breaking the graph G into a plurality of sets, wherein each set Cj in the plurality of sets (i) corresponds a qubit j in the plurality of qubits and (ii) comprises a representation of the qubit j and parent qubits $\partial+j$ in the graph G; and
for each set Cj in the plurality of sets, characterizing a corresponding local conditional probability distribution $Pr(e_j|e_{\partial+j})$, wherein $e_j \in \mathcal{P}_j$ is a Pauli error on the $j^{th}$ qubit and $e_{\partial+j}$ is a Pauli error on the parent qubits of the $j^{th}$ qubit, by estimating a local Pauli fidelity for the set Cj, thereby learning the model of the noise afflicting the quantum computer; and
estimating a performance of a fixed quantum error-correcting code on the quantum computer using the model of the noise afflicting the quantum computer.

16. The method of claim 15, further comprising:
mapping the fixed quantum error-correcting code to an associated Ising model, wherein estimating the performance of the fixed quantum error-correcting code comprises identifying a partition function that provides an optimal threshold for the fixed quantum error-correcting code.

17. The method of claim 15, further comprising:
decoding the fixed quantum error-correcting code, using the graph G, after the fixed quantum error-correcting code has been applied to the quantum computer, wherein the decoding comprises contracting a set of tensor networks for the fixed quantum error-correcting code.

18. The method of claim 15, further comprising:
decoding the fixed quantum error-correcting code, using the graph G, after the fixed quantum error-correcting code has been applied to the quantum computer, wherein the decoding comprises application of a Monte Carlo method for the fixed quantum error-correcting code.

19. The method of claim 15, further comprising:
logically reducing a source of noise afflicting the quantum computer to Pauli noise by an application of Pauli twirling.

20. A non-transitory computer readable storage medium storing one or more programs, the one or more programs comprising instructions, which when executed by a computer system with one or more processors, cause the computer system to:
obtain a graph G that describes a conditional independence structure of a noise afflicting a quantum computer comprising a plurality of qubits, wherein the graph G includes a node for each qubit in the plurality of qubits and wherein the noise afflicting the quantum computer is logically reduced to Pauli noise;
break the graph G into a plurality of sets, wherein each set Cj in the plurality of sets (i) corresponds a qubit j in the plurality of qubits and (ii) comprises a representation of the qubit j and parent qubits $\partial+j$ in the graph G; and
for each set Cj in the plurality of sets, characterize a corresponding local conditional probability distribution $Pr(e_j|e_{\partial+j})$, wherein $e_j \in \mathcal{P}_j$ is a Pauli error on the $j^{th}$ qubit and $e_{\partial+j}$ is a Pauli error on the parent qubits of $j^{th}$ qubit, by estimating a local Pauli fidelity for the set Cj, thereby learning a model of the noise afflicting the quantum computer; and
estimate a performance of a fixed quantum error-correcting code on the quantum computer using the model of the noise afflicting the quantum computer.

* * * * *